United States Patent
Josefowitz et al.

(10) Patent No.: US 9,617,089 B2
(45) Date of Patent: Apr. 11, 2017

(54) PASSIVE SWITCH FOR A LINEAR-MOTOR-OPERATED TRANSPORT SYSTEM FOR PIECE GOODS

(71) Applicant: KRONES AG, Neutraubling (DE)

(72) Inventors: Mareike Josefowitz, Braunschweig (DE); Markus Prinz, Tuntenhausen (DE); Stefan Elsperger, Söchtenau (DE); Manfred Kieslinger, Stephanskirchen (DE); Konrad Senn, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/913,181

(22) PCT Filed: Sep. 3, 2014

(86) PCT No.: PCT/EP2014/068723
§ 371 (c)(1),
(2) Date: Feb. 19, 2016

(87) PCT Pub. No.: WO2015/036302
PCT Pub. Date: Mar. 19, 2015

(65) Prior Publication Data
US 2016/0207719 A1    Jul. 21, 2016

(30) Foreign Application Priority Data
Sep. 13, 2013 (DE) ......... 10 2013 218 389

(51) Int. Cl.
*B65G 47/46* (2006.01)
*B65G 47/10* (2006.01)
(Continued)

(52) U.S. Cl.
CPC .......... *B65G 54/02* (2013.01); *B60L 13/003* (2013.01); *E01B 25/34* (2013.01)

(58) Field of Classification Search
CPC   B65G 2811/0668; B65G 57/04; B65G 23/18; B65G 54/02; B65G 47/71; B65G 21/2009
(Continued)

(56) References Cited

U.S. PATENT DOCUMENTS 3,696,753 A    10/1972  Ross et al.
4,138,008 A *  2/1979   Del Rosso ........... B65G 17/005
                                               198/439
(Continued)

FOREIGN PATENT DOCUMENTS

DE         1963505 A1    7/1970
DE    102009050511 A1    5/2011

OTHER PUBLICATIONS

German Search Report for Application No. 10 2013 218 389.5, dated Mar. 31, 2014.
(Continued)

*Primary Examiner* — James R Bidwell
(74) *Attorney, Agent, or Firm* — Marshall, Gerstein & Borun LLP

(57) ABSTRACT

A transport system with a transport track with at least one passive track switch, which includes a main track and first and second diverging side tracks of the transport track, and at least one transport element with a response element with at least one permanent magnet and/or non-switching electromagnet. The transport track has fixed first and second guide rails in the area of the passive track switch as well as linear motor strings that are arranged in parallel to the first and second guide rail. The response element of the transport element is engaged within a gap between the first and the second linear motor string.

15 Claims, 3 Drawing Sheets

(51) Int. Cl.
*B65G 54/02* (2006.01)
*B60L 13/00* (2006.01)
*E01B 25/34* (2006.01)

(58) Field of Classification Search
USPC .......................... 198/370.13, 439, 805, 679
See application file for complete search history.

(56) References Cited

U.S. PATENT DOCUMENTS 5,190,136 A * 3/1993 Grecksch ........... B65G 21/2009
198/370.13
5,409,095 A * 4/1995 Hoshi ..................... B07C 5/362
198/370.13

OTHER PUBLICATIONS

International Search Report for Application No. PCT/EP2014/068723, dated Oct. 29, 2014.
Notification of First Office Action in Chinese Application No. 201480050272.0 dated Sep. 20, 2016 (English Translation).

* cited by examiner

PASSIVE SWITCH FOR A LINEAR-MOTOR-OPERATED TRANSPORT SYSTEM FOR PIECE GOODS

CROSS-REFERENCE TO RELATED APPLICATION

The present application is a U.S. national phase of International Patent Application No. PCT/EP2014/068723, filed Sep. 3, 2014, which application claims priority to German Application No. 102013218389.5, filed Sep. 13, 2013. The priority application, DE 102012118389.5, is hereby incorporated by reference.

FIELD OF THE DISCLOSURE

The present invention relates to a device and a method for switching of passive track switches for transport systems with linear engines, particularly for transport systems for individual container transport in a container treatment station.

STATE OF THE ART

Transport systems with a linear engine drive are well known in the state of the art. The most prominent example are high-speed passenger trains on the basis of magnetic levitation. Transport systems with a linear engine drive, however, are also used in many industrial fields, particularly for the individual transport of single items within manufacturing lines.

But all transport systems with a linear engine drive have the common feature of transport elements, which are formed specifically for this purpose, being moved through magnetic interaction with the long stator(s) of one or several linear engines along one or several guide rails. As both the long stators as well as the guide rails have to be disposed along the overall transport track, the installation of ramifications in the form of track switches in transport systems with linear engines is generally relatively complicated and elaborate. For example, active track switches are known in the state of the art, in which an entire section of the transport rack including the guide rail and/or long stator has to be moved mechanically for switching. To reduce the mass that needs to be moved during switching and to shorten the switching time of the track switch, track switches are further known in which, in the same way as to move track switch rails in railway track switches, systematic conveying of the transport element that enters the track switch in a desired direction is achieved through mechanical movement of a switching element that is formed especially for this purpose. However, particularly in transport systems with external double linear engines, such active track switches are difficult to implement and in addition have long switching times due to the masses to be moved of the mechanically moved components. A high throughput on transport elements per unit of time as required for example in transport systems of container treatment stations is consequently not possible. In addition, active track switches are subject to high wear and an increased error rate due to their mechanical switching elements.

Hence, the purpose of the present invention is to provide a device and a method for dynamic switching of a track switch in a transport system with a linear engine drive, particularly in a transport system for the transport of containers in a container treatment station, which enables a high throughput rate of transport elements per unit of time and therefore overcomes the abovementioned disadvantages. In very general terms, the purpose of the present invention is to reduce the costs for the installation and operation of a track switch of a transport system for the individual transport of single items with a plurality of individually controllable transport elements.

DESCRIPTION OF THE INVENTION

The abovementioned problem is solved by a transport system, particularly for the transport of containers in a container treatment station, with
a transport track with at least one passive track switch and
at least one transport element, which is arranged in a flexible way on the transport track; whereby the passive track switch comprises a main track and first and second diverging side tracks of the transport track; whereby the transport track comprises the following elements:
a first guide rail;
a second guide rail that is opposite to the first guide rail in the region of the main track,
a first linear motor string that is arranged in parallel to the first guide rail and
a second linear motor string that is arranged in parallel to the second guide rail; whereby the transport element has a response element with at least one permanent magnet, which is preferably aligned transversally to the transport rail, and/or non-switching electromagnet that is engaged within a gap between the first and the second linear motor string, whereby the transport element can be moved along the transport track through interaction of the permanent magnet and/or non-switching electromagnet with the first and/or second linear motor string, and whereby the first and the second guide rail, particularly in the area of the passive track switch, are fixed.

The transport device can in particular be a transport system for the transport of containers in a container treatment station. For this purpose, the transport system can have a plurality of transport elements for the transport of one or several containers, whereby the plurality of transport elements is disposed in a flexible way on the transport track of the transport system. In principle, there can be a random number of transport elements on the transport track, which is only limited by the length of the transport track, as long as there is at least one transport element. To insert at least one container at an input and to discharge the containers at an output, the transport elements can be equipped with a suitable holding system, e.g. in form of a gripping element. The gripping element can thereby be formed in an actively or passively controllable way. In particular, gripping elements for form-fit or force-locking gripping of a neck area of the containers, e.g. for the so-called neck handling of plastic bottles, are adjustable, whereby the held recipient is positioned rotatably around its longitudinal axis in the gripping element during the form-fit gripping process. In addition, the gripping element can be formed tiltably and/or adjustably in height.

Containers are in particular beverage bottles, but also other containers for food, medicines, hygiene articles, cleaning agents or the like such as cans, glass bottles and other glass containers with a lid, packaging on the basis of cardboard or composite materials, tetra pack or similar items. Likewise, intermediate products, in particular preforms for blow molding of the containers, are also possible with regard to plastic containers. Furthermore, also composed bundles with several containers shall be understood as containers.

The at least single transport element can be formed as a rotor, puck, slide, shuttle or the like, which is moved according to the invention through interaction with the first and/or second linear motor string of the transport track along the transport track. Each transport element can thereby be accelerated, slowed down, moved with a constant speed or also stopped temporarily or definitely on the transport track as required. Hence, a variable distance-time profile of each individual identification unit can be achieved through individual control of the transport elements. In addition, each transport element can comprise an unambiguous identification unit, e.g. in form of a barcode, readable memory chips, a printed, adhesive and/or engraved alphanumeric code etc., whereby through one or several suitable identification recording devices along the transport track, in particular upstream of the at least single passive track switch, an identification of the transport element that passes the respective identification recording device is enabled. The identification unit of the transport element can be used in particular for systematic conveying of the transport element, e.g. in the direction of the first or the second diverging side track of the transport track, through appropriate automated switching of the passive track switch.

In principle, the transport track can have any form. In particular, the transport track can be essentially closed, whereby essentially closed shall mean that the transport track enables at least one closed path for the transport elements. Apart from that, the transport track can have many ramifications through the integration of one or several passive track switches, whereby a ramification of a main track of the transport track into first and second diverging side tracks and/or a combination of a first and a second side track to a main track of the transport track is enabled as a function of the orientation of the respective passive track switch and of the movement direction of the transport elements in the area of the track switch.

According to the invention, the transport track comprises a first guide rail and a second guide rail, whereby the second guide rail is opposite to the first guide rail in the area of the main track. The arrangement of the first and second guide rail in the area of the main track therefore corresponds to the well-known parallel guiding system of guide rails in double-rail systems such as in railway tracks. However, the first and the second guide rail diverge in the area of the passive track switch in order to form in their extension the right and/or left guide rail of the first and/or second diverging side track. Thereby, the complementary guide rails of the first and second diverting side tracks, which are needed to complete the double-rail structure of the first and/or second diverging side track, are positioned on the track switch tip. Hence, also the first and second side track each have a pair of parallelly guided guide rails that respectively provide one guide rail through the first and/or second guide rail of the main track.

By analogy, the transport track comprises a first linear motor string, which is arranged in parallel to the first guide rail, and a second linear motor string that is arranged in parallel to the second guide rail, whereby two further complementary linear motor strings were positioned on the track switch tip that were required for the completion of the double-stranded linear drive of the first and/or second side track.

The form and cross-section of the guide rails are thereby at random and are only determined by the design of the transport element as well as the bearing elements of the transport element by means of which the transport element is positioned movably on the guide rails. For example, each guide rail can have a guide channel in which a guide pin of the transport element is guided, and/or a wheel flange on which one or several appropriately disposed guide rollers of the transport element roll off. A plurality of alternative embodiments, e.g. by means of a slide bearing, is possible here. Through the provision of the first and second guide rail on the transport track, sliding of the transport elements along the transport track with a low friction can be enabled. In addition, the transport track can have a tread area on which respective support elements, e.g. support rollers, can roll off and/or slide. Guide channels, wheel flanges, tread areas or similar elements, which can hamper a direction change of the transport element while branching off in the area of the passive track switch, can be interrupted in the area of the passive track switch.

The first and the second linear motor string according to the invention are formed as long stators of, particular synchronous, linear engines. In an alternative embodiment, the first and the second linear motor string can also be formed as asynchronous linear engines, whereby the at least single permanent magnet and/or non-switching electromagnet of the response element of the transport element and/or an electrically conductive element of the transport element, e.g. in form of a metallic plate on which the permanent magnet and/or non-switching electromagnet are installed, can work as electric conductors for the induction through the asynchronous linear engines.

According to the invention, the propulsion of the transport element takes place along the transport track through interaction of the at least single permanent magnet and/or non-switching electromagnet of the response element of the transport element with the first and/or second linear motor string. For this purpose, the response element of the transport element is arranged in a way that it is engaged within a gap between the first and the second linear motor string in the area of the main track. During movement of the transport element along the main track, its response element consequently moves in the gap between the first and the second guide rail along the first and second linear motor string. In the area of the side tracks, the response element encroaches accordingly into a gap between the two linear motor strings that are located opposite to each other. Here and in the following, the response element of a transport element denominates the sub-unit of a transport element on which a force to move the transport element is applied through interaction with appropriate interaction elements of the transport track, herein with the linear motor strings.

The first and the second linear motor string can be formed in a particularly simple design through a plurality of electric windings along the respective strand in form of electromagnets that can be activated individually or in blocks. Also more complex designs, e.g. by means of a Halbach arrays of the electromagnets to reinforce the magnetic flow on the side that faces the response element, are also possible in this context. According to the invention, the transport element is formed as a passive transport element, which is moved through a response element with at least one permanent magnet and/or non-switching electromagnet through interaction with the alternating electromagnetic fields that are created by the electromagnets of the first and/or second linear engine that can be activated individually. A non-switching electromagnet is thereby connected to a power supply unit and/or a control unit of the transport system in a way that it is always traversed in the same direction by a preferably controllable electric current.

In a simple embodiment, the at least single permanent magnet and/or non-switching electromagnet can be installed on the response element of the transport element in a transversal position to the transport track so that one of the magnetic poles of the permanent magnet and/or non-switching electromagnet can interact with the first linear motor string while the other magnetic pole can interact with the second linear motor string. Alternatively, the sides of the response element that face the first linear motor string and the second linear motor string, however, can also have separate permanent magnets and/or non-switching electromagnets that can be formed particularly in a Halbach array to reinforce the magnetic flux in the direction of the respective linear motor string. In this case, the permanent magnets and/or non-switching electromagnets are arranged in the plane whose normal connects the first and the second linear motor string orthogonally. A supply of the at least single non-switching electromagnet of the response element of the transport element with the required electric energy can be achieved through an electric wire or power supply rail that is arranged along the transport track or through electric contacts of the transport element, e.g. through power collectors. Alternatively, a transmission of the required electric energy via induction is possible.

The at least single transport element can be guided along the transport track by means of a control and/or regulating unit, e.g. in form of a process computer. The control and/or regulating unit can thereby be implemented as a central control and/or regulating unit of the transport system and/or through control and/or regulating units that are installed on the transport elements in a decentralized way. Furthermore, the single or several control and/or regulating units can be formed as programmable memory control unit(s). Through systematic activation of individual electromagnets and/or individual blocks of electromagnets of the first and/or second linear engine thread in a limited area of the transport track, a specific transport element can be systematically accelerated and hence moved so that the transport element can be led along the transport track individually and regardless of other transport elements of the plurality of transport elements of the transport system. In this process, the activation of the electromagnets of the first and second linear motor string takes place by means of the control and/or regulating unit of the transport system. In particular, the current strength through the electric windings of the electromagnets of the first and second linear motor string can be regulated individually and by the control and/or regulating unit as a function of a force requirement of the transport element to be moved in an automated way. Through individual control and/or regulation of the current strength through individual windings of the linear motor strings, the transport element can be accelerated, slowed down or moved with a constant predetermined speed.

Depending on the formation of the first and second guide rail, the response element and/or the first and second linear motor string, the at least single transport element can be positioned on the transport track in a completely magnetic or partially magnetic and partially mechanical or completely mechanical way. In case of a completely magnetic positioning, the transport track is formed as a magnetic levitation system, whereby the magnetic interaction between the response element of the transport element and the first and/or second linear motor string leads to a magnetic levitation of the transport element between the first and the second guide rail. In this case, the first and second guide rail only serve as holding devices while the linear drive is switched off and/or as limiters in order to avoid swerving of the transport element out of the transport track. Through magnetic levitation, the friction between the transport element and the transport track can be reduced to a minimum. In case of a partially magnetic and partially mechanical mounting, the transport element can in addition have one or several support elements, e.g. in form of support rollers and/or guide rollers that roll off on the first and/or second guide rail. Likewise, a partially or completely mechanical mounting by means of at least one slide bearing is possible. A formation of the bearing of the transport elements by means of slide bearings, which are in contact with the first and/or second guide rail, are particularly cost-efficient. Additional support elements and/or slide bearings can thereby roll and/or slide on an additional tread area of the transport track. In case of a completely mechanical bearing, the transport element can be mounted exclusively by means of the described support elements and/or slide bearings. Support elements, support rollers and/or slide bearings used can preferably be arranged symmetrically with regard to the first and second guide rail on the transport element. In addition or as an alternative, a bearing can also be ensured pneumatically, whereby the transport track is formed as an aerial levitation system. In case of a pneumatic bearing, just as in case of a completely mechanical bearing, there will be a minimization of the friction between the transport element and the transport track.

For individual control of the transport element along the transport track, the position of the transport element can, through regular and periodic installation of sensors along at least one section of the transport track, be determined on this section of the transport track. In this, the sensors can be formed as an optical sensor, electric sensor, electromagnetic sensor or mechanical sensor, whereby the position of the transport element in the area of the sensor can be determined for example through measurement of a light reflection on a reflector element of the transport element, through induction of an electromagnetic signal due to the movement of the transport element, through modification of the electric resistance of the sensor by taking advantage of a magnetoresistive effect, e.g. due to the magnetic flux of a magnetic reference element, in particular a permanent magnet, or the response element of the transport element, or through local pressure measurement due to the weight of the transport element.

An electromagnetic sensor can thereby also be formed as a Hall effect sensor, which also provides a signal when the magnetic field in which it is located is constant. Likewise, there will be a change of the electric resistance, which is dependent on the magnetic field to be measured, in the embodiment of an electromagnetic sensor as a magnetic field sensor on the basis of magnetoresistive effects such as the anisotropic magnetoresistive effect (AMR effect) of the "gigantic" magnetoresisitive effect (GMR effect) as well as further magnetoresistive effects such as the CMR effect and the TMR effect. Both Hall effect sensors as well as magnetoresistive sensors therefore also allow for the determination of the position of the transport element along the transport track without inductive effects, i.e. also when the transport element is standing still. The respective sensor thereby detects a local change of the magnetic background field through the response element, particularly through a permanent magnet and/or electromagnet of the transport element that is installed on it. Alternatively or in addition, the transport element can have a signal unit, which detects one or several position signals that are sent from spatially separate signal units of the control and/or regulating unit of the transport system, in order to determine on this basis, for example through transit time measurements, the position of the transport element along the transport track. This signal unit of the transport element can be formed in particular as a RFID chip.

By means of a plurality of sensors installed along the transport track, a control and/or regulating unit of the transport system can determine in particular the position of a transport element on the intake to the passive track switch. Thereby, switching of the passive track switch can occur, by means of the control and/or regulating unit, at the time at which the transport element has achieved a predetermined distance from the ramification point of the track switch. In addition, a respective identification unit of the transport element can be recorded by means of an identification recording device installed in the intake of the passive track switch to identify the transport element in the intake to the passive track switch. Hence, individual transport elements can systematically be led into the first or the second diverging side track through appropriate switching of the passive track switch. Thus, a distribution of the flux of transport elements at the passive track switch can be implemented by means of the control and/or regulating unit.

According to the invention, the first and the second guide rail are fixed, particularly in the area of the passive track switch. This means that neither the guide rails nor parts of the guide rails are moved during switching of the passive track switch. In contrast to active track switches, in which switching of the track switch is ensured through mechanical movement of at least parts of the guide rails, a passive track switch does not have any such moved parts of the guide rails. As no, in particular heavy, parts of the guide rails consequently have to be moved to switch the track switch, the switching time of the track switch can be reduced significantly whereby a lower distance of the transport elements in the intake of the passive track switch can be implemented. As generally a large number of containers is transported by means of the plurality of transport elements in container treatment stations, the throughput rate of the transport system and hence of the container treatment station can be increased by means of using a passive track switch of the present invention. In addition, a passive track switch is subject to a lower degree of wear than an active track switch with mechanically moved guide rails.

According to a further development, the first and the second linear motor string can have a ferromagnetic component, particularly in form of an iron core, in the branching region of the passive track switch. The branching region of a passive track switch can hereby be defined as the area of the track switch between the point on which the first and second guide rail, which are guided in parallel along the main track, start to diverge, and the two connection lines that link the track switch tip, i.e. the point at which the complementary guide rails of the first and second diverging side tracks begin, perpendicularly to the first and/or second guide rail. Alternatively, the branching region of the passive track switch can be defined as the area between the described point of starting divergence of the first and second guide rail and the points of the first and second side rails that are closest to the tip of the track switch and on which the curvature of the first and/or second guide rail is zero. Due to the inevitable curvature of the first and/or second guide rail in the branching region of the passive track switch, partly considerable centrifugal forces can occur, depending on the speed, during conveying of the transport element in the direction of the first and/or second side track. According to the invention, these centrifugal forces are compensated by the magnetic attraction force between the permanent magnet and/or non-switching electromagnet of the response element of the transport element and the ferromagnetic component of the respective linear motor string that belongs to the side track along which the transport element is to be guided. The ferromagnetic component of the first and the second linear motor string can thereby be implemented, as described, in form of an iron core of the electromagnets of the respective linear motor string or also by means of a separate ferromagnetic element, e.g. a ferromagnetic carrier element of the linear motor string. When the transport element is moved outside of the branching region of the passive track switch, the laterally acting attraction forces between the response element and the linear motor string cancel each other out due to the preferably symmetric arrangement of permanent magnets and/or non-switching electromagnets of the response element in relation to the first and second linear motor string, whereby the symmetric attraction forces further contribute to keeping the transport element between the first and second guide rail.

According to another further development, the permanent magnet and/or non-switching electromagnet can be formed in a way that a magnetic attraction force between the permanent magnet and/or non-switching electromagnet and the first and/or second linear motor string is suitable to keep the transport element, which is in particular loaded with a predetermined payload, in the branching region of the passive track switch in a plane that is formed by the first and second guide rail. A predefined payload that is carried along by the transport element depends on the use of the transport system. In transport devices that are to be used for the transport of containers in container treatment stations, particularly for the treatment of plastic bottles, the predetermined payload for unfilled containers can amount to a maximum of 100 g and to a maximum of 2.5 kg for filled containers. According to the present further development, the strength of the permanent magnet(s) and/or the non-switching electromagnet(s) is chosen in a way that the transport element can be held on the guide rail that belongs to the respective linear motor string due to the magnetic attraction force between the magnets of the response element and the linear motor string, which is in particular equipped with a ferromagnetic component, on the side of the side track in whose direction the transport element is to be guided.

When entering the branching region of the passive track switch, a contact of the transport element, particularly by means of one or several bearing elements, to the guide rail that does not lead to the side track has to be interrupted for the conveying process of the transport element in the direction of one of the two side tracks. Depending on the position of the transport element on the first and second guide rail, a guide element such as a guide channel, a guide groove, a guide edge, a guide ring or the like can therefore be interrupted in the branching region of the passive track switch both on the first as well as on the second guide rail. To ensure that the transport element can still be guided stably along the respective guide rail that leads to the target side track, the magnetic attraction force between the magnet(s) of the response element and the linear engine that is disposed along the guide rail is dimensioned appropriately according to the invention.

If at least one permanent magnet is used on the response element of the transport element, a stable retention of the transport element on the guide rail that leads to the target side track can also be guaranteed when the linear motor strings are switched off, e.g. after shutdown of the transport system and/or in case of power failure. Through arrangement of at least one non-switching electromagnet on the response element of the transport element, the magnetic attraction force that is needed for stable guiding can in turn be automatically adapted by means of the control and/or regulating unit of the transport system to a loading state of the transport element, which is determined unambiguously e.g. by means of the identification unit of the transport element, by means of controlling the current strength through the at least single non-switching elecgromagnet. It is clear that the switching behavior of the passive track switch described here and in the following, which is described with regard to conveying a transport element, that is guided along the main track to the track switch, in the direction of the first or second side track, is also applicable accordingly for the reverse conveying process of a transport element, which is guided to the track switch along the first or second side track, in the direction of the main track. The elements and methods required for switching of the passive track switch are thereby independent of whether the track switch is a ramification of a main track or a combination of two side tracks. By means of sensors disposed along the side tracks, switching of the track switch can also be triggered when a transport element approaches the track switch tip at a predetermined distance along a side track. Only an identification recording device that can be provided in the intake to the track switch along the main track is no longer required along the side track. In contrast, however, it must be avoided by means of the control and/or regulating unit of the transport system that two transport elements are simultaneously guided into the main track from the two side tracks via the passive track switch. Depending on the desired maximum speed of the transport elements when passing the track switch and depending on the maximum curvature of the guide rails in the area of the track switch, the at least single permanent magnet can be provided with a sufficiently strong magnetic field strength and/or the current strength through the at least single non-switching electromagnet can be controlled automatically.

According to a specific further development, the passive track switch can comprise a switch through which a power supply of the first linear motor string or the second linear motor string in the branching region of the track switch can be selectively interrupted for the switching of the track switch. For this purpose, the first linear motor string and the second linear motor string in the branching region of the track switch can each have a separate segment that can be supplied with power regardless of the rest of the respective linear motor string. According to the invention, these segments can be connected to a power supply unit of the transport system by means of a switch in a way that either the segment of the first linear motor string or the segment of the second linear motor string, but never both at the same time, can be supplied with power. Switching of the passive track switch to guide the transport element in the direction of the first or the second side track therefore occurs by way of the switch taking on either the first position, in which only the segment of the first linear engine is supplied with power, or the second position, in which only the segment of the second linear motor string is supplied with power. If, for example, the power supply of the linear engine on the side of the first side track is switched off, the propulsion of the transport element in the branching region will only be caused by the linear motor string on the side of the second side track. On the side of the first side track, only the magnetic attraction force will work between the at least single permanent magnet and/or non-switching electromagnet of the response element and the linear motor string that is in particular equipped with a ferromagnetic component. On the side of the second side track, in contrast, the attraction force between the linear motor string that is supplied with power and the magnet of the response element works in addition to this attraction force. This additional force is strong enough to keep the transport element on the guide rail at the side of the second side track and therefore to trigger the direction change. When disconnecting the contact of the bearing element(s) of the transport element on the side of the first side track from the guide rail that is located there, the attraction force of the magnets of the response elements onto the ferromagnetic component of the linear motor string supplied with power supports the attraction force of the linear motor string supplied with power onto the magnets of the response element in order to keep the transport element safely in the plane that is formed by the first and second guide rail and to guide it along the guide rail on the side of the second side track. Through interruption of the power supply of the linear motor string on the side of the second side track, the transport element can be conveyed analogously in the direction of the first side track.

After reaching the first and/or second side track and leaving the branching region of the passive track switch, the transport element can be guided on both sides by means of supplying the respective linear motor string that is complementary to the linear motor string supplied with power on the opposite side of the respective side track with power and activating it by means of the control and/or regulating unit of the transport system for further guiding of the transport element along the side track. In a particularly simple further development, the respective electromagnets of the linear motor strings that are opposite to each other can be interconnected in the area of the side tracks as well as the main track with the power supply and the control and/or regulating unit of the transport system in a way that they can be operated synchronously to each other by means of a common control signal. Thereby, the ambilateral attraction forces between the linear motor strings and the magnets of the response elements cancel each other off in a lateral direction so that only forces that support the propulsion and/or the bearing of the transport element arise as a result.

By means of the switch for selective interruption of the power supply of the first or the second linear motor string, a passive track switch can therefore be implemented according to the present invention, in which no mechanically moved components are needed for switching. A switching time of the passive track switch implemented this way is consequently only limited by the switching time of the switch, particularly by the inductivities of the electric windings of the linear motor strings in the area of the track switch. As switching of the track switch takes place by means of the interaction of the linear motor strings used for the propulsion and magnets of the response element of the transport element, no additional electromagnets are hence required to convey the transport element systematically in the direction of the first or second transport track. Furthermore, an even propulsion of the transport element when passing the track switch is possible due to the linear motor string that is used for switching.

According to an alternative further development, the passive track switch can comprise a switch through which a magnetic polarity of the first linear motor string or the second linear motor string can be selectively inverted in the branching region of the track switch for switching. In this further development, segments of the first linear motor string and the second linear motor string can be operated independently of each other in the branching region of the track switch. Through inverting the magnetic polarity of one of the two segments, the magnetic attraction force described before between the linear motor string and the at least single permanent magnet and/or non-switching electromagnet of the response element of the transport element can be transformed into a generally equal, repelling force that pushes the transport element in the direction of the opposite side track while it passes the branching region of the track switch. In particular, the repelling force created this way compensates a part of the attraction force between the magnets of the response element and the linear motor string with an inverted polarity, which is in particular equipped with a ferromagnetic component. Through inversion of the polarity, the magnetic interaction between the magnetic poles of the linear motor string and the response element that are located opposite to each other is consequently reversed while the attraction force of the magnets of the response element onto the ferromagnetic component of the linear motor string opposite to it remains unaffected.

Alternatively or in addition, the linear motor string that is opposite to the side of the target side track can be covered with a high-frequency alternating field, which induces highly frequent eddy currents in an electrically conductive component, e.g. a carrier plate, of the response element that are repelled by the high-frequency alternating field of the linear motor string according to Lenz's law. The electrically conductive element is preferably a non-ferromagnetic element, which can for example be repelled with alternating fields in the range from 50 to 500 Hz. If a ferromagnetic electrically conductive element is used, alternating fields with a higher frequency will be generally needed. The high-frequency alternating fields used for repellency can thereby be superimposed on the low-frequency currents for the activation of the linear motor string. Hence, a high-frequency alternating field that has a repelling effect on an electrically conductive response element can also be combined in an advantageous way with the inversion described above of the magnetic polarity of a linear motor string in the branching region of the track switch.

According to another further development, the switch can be integrated in a, in particular electronic, control unit of the transport system. The control unit can in particular be the control and/or regulating unit of the transport system described above. By means of such an electronic switch, the control and/or regulating unit of the transport system can therefore convey any transport element of a flow of transport elements systematically in the direction of the first or the second side track, even under conditions of high throughput. Hence, a distribution of a product flow can be achieved in a simple way, whereby the respective transport elements can be identified unambiguously by means of their identification units in the intake to the passive track switch and conveyed accordingly in the direction of the first or second side track.

According to a further development, the first and the second linear motor string in the branching region of the passive track switch can be formed in a way that opposite magnetic poles of the first and the second linear motor string either have always a cophasal or always an antiphase polarity as a function of an alignment of the permanent magnet and/or a polarity of the non-switching electromagnet of the transport element. If the permanent magnet(s) and or the non-switching electromagnets of the response element of the transport element are arranged and/or polarized in a way that the respective magnetic poles of the side of the response element that faces the first linear motor string and/or the side that faces the second linear motor string have the same polarity, opposite magnetic poles of the first and the second linear motor string in the branching region of the passive track switch will always have an antiphase polarity according to the present further development. As a result, there is always a magnetic attraction force on one side of the response element between the linear motor string disposed there and the magnetic poles of the magnets of the response element of this side, while there is always a repelling force on the other side between the linear motor string disposed there and the magnetic poles of the magnets of the response element on that side.

By analogy, opposite magnetic poles of the first and the second linear motor string in the branching region of the passive track switch always have a cophasal polarity according to the present further development, provided that the corresponding magnetic poles of the magnet(s) on the two sides of the response elements are different from each other.

As a function of the chosen arrangement of the magnets on the response element of the transport element, the first and the second linear motor string in the branching region of the passive track switch can, according to the invention, be interconnected to a power supply unit and/or a control and/or regulating unit of the transport system in a way that there is always an attracting magnetic force on one side of the response element and always a repelling magnetic force on the other side of the response element in the branching region of the track switch. When the magnetic polarity of one of the two linear motor strings in the branching region of the track switch is inverted by means of the control and/or regulating unit, also the magnetic polarity of the other linear motor string is therefore inverted automatically, whereby switching of the passive track switch from one of the two side tracks to the other of the two side tracks is enabled in a simple way. As a result, the supporting repelling interaction between the response element and the linear motor string on the side that is opposite to the target side track described before can be guaranteed automatically through appropriate interconnection of the first and the second linear motor string in the branching region. Hence, both the activation of the passive track switch can be simplified and its error rate can be reduced by means of such interconnection.

In an alternative or additional further development, the passive track switch can have a conveyor drive in its branching region, whereby the transport element has a contact area that is arranged in a way that it comes in contact with the conveyor drive in the branching region of the track switch and whereby the conveyor drive comprises at least a first conveyor belt that can be activated by means of a control unit of the track switch.

Conveyor drives for the propulsion of transport elements along a transport track are well known in the state of the art. Therefore, the conveyor belt of such a conveyor drive is generally brought in contact, either directly or indirectly, with a contact area of the transport elements so that a force starts acting onto the transport element due to the friction between the conveyor belt and the contact area when the conveyor belt is activated and generally circulating. According to the invention, the passive track switch has such a conveyor drive with at least one first conveyor belt that can be activated by means of a control unit of the track switch. The control unit of the track switch can be, as described before, the control and/or regulating unit of the transport system. The conveyor drive is hereby limited to the branching region of the track switch. Depending on the formation of the transport element and in particular depending on the arrangement of the payload carried along by the transport element, the contact area of the transport element can be disposed for example on a lower end of the response element or also on the side of the transport element that is opposite to the response element, e.g. in an upper area of the transport element. Accordingly, the conveyor drive of the passive track switch can be installed below or above the track switch if the track switch is arranged horizontally.

According to another further development, the first conveyor belt can be disposed in a way that it applies a force onto the contact area of the transport element, which is located in the branching region, in the direction of the first diverging side track in the activated state. Therefore, the first conveyor belt can be arranged obliquely to the direction of the main track in a way that a force con be applied onto the contact area in the direction of the first side track during operation of the conveyor belt in a predetermined direction. Accordingly, the conveyor drive can comprise at least a second conveyor belt that is arranged in a way that it applies a force onto the contact area in the direction of the second side track in the activated state. In particular, the conveyor drive can comprise respectively one group of conveyor belts that are disposed in an offset position to each other along the direction of the respective side track in the branching region of the passive track switch. Through arrangement of several conveyor belts in the direction of a side track, a lateral force can therefore be applied continuously onto the contact area of the transport element by means of activating the conveyor belts in order to convey the transport element systematically in the direction of the side track. Thereby, the conveyor belts of the first group or the conveyor belts of the second group can be activated alternatively for the purpose of switching the track switch, whereby the activation can occur by means of a control unit of the track switch. The conveyor belts of the respective group can thereby be arranged in the simplest case perpendicularly to the respective guide rail to achieve a maximum deflection of the transport element due to the force applied onto the contact area. Depending on the arrangement and expansion of the contact area, the individual conveyor belts can be formed with a short length, e.g. of 2 to 5 cm.

According to another further development, the applied force can support a propulsion of the transport element in the direction of the first diverging side track. Therefore, the conveyor belts of the respective group can be installed in a way that they are tilted at a predetermined angle against the perpendicular line in the direction of the respective side track so that the force applied by the conveyor belts has both a component that is perpendicular to the guide rail that corresponds to the side track as well as in the longitudinal direction of the side track and consequently supports the propulsion of the transport element in the direction of the respective side track. The tilt angle at which the conveyor belts are positioned obliquely is thereby smaller than 90° and can be different for each conveyor belt of the group. In particular, the tilt angle within the group can increase in the direction of the side track so that a substantially lateral deflection of the transport element in the direction of the side track occurs through the first conveyor belt of the group, whereas a propulsion of the transport element in the direction of the side track occurs essentially through the last conveyor belt of the group. Apart from that, a potential deviation from a predefined distance of the transport element from the guide rails due to undesired, particularly symmetric, attraction forces on one side of the response element can be avoided through the oblique position of the conveyor belts.

The contact between the contact area of the transport element and the conveyor belt(s) of the conveyor drive of the passive track switch is limited to the branching region and is only used for switching the track switch without moving any parts of the guide rails. A propulsion of the transport element outside of the branching region of the passive track switch occurs, however, as described above due to the magnetic interaction of the respective linear motor strings with the magnets of the response element of the transport element.

According to another further development, a ball mat can be arranged between the contact area of the transport element and the conveyor drive of the passive track switch in a way that the contact area of the transport element comes in contact with the conveyor drive through the ball mat in the branching region of the passive track switch. Through provision of a ball mat as an agent of the force between the conveyor drive and the transport element, wear of the conveyor drive can be reduced in particular. Thereby, however, it is important to note that the drive direction of the individual conveyor belts of the conveyor drive has to be reversed, due to the ball mat, in relation to the arrangement described above with direct contact to the contact area.

Just as through switching of the passive track switch by means of systematic activation of the first and/or second linear motor string, switching the track switch by means of the described conveyor drive can lead to a reduction of the switching time of the track switch and hence to an increased throughput rate of the transport system. In particular, the described conveyor drive can be combined in a supporting way with the switching process of the track switch by means of systematic activation of the linear motor strings as described above.

The abovementioned problem is also solved by a method for switching a passive track switch of a transport system with a transport track and at least one transport element that is installed movably on the transport track, whereby the passive track switch comprises a main track and first and second diverging side tracks of the transport track; whereby the transport track comprises the following elements:
- a first guide rail,
- a second guide rail that is located opposite to the first guide rail in the region of the main track,
- a first linear motor string that is arranged in parallel to the first guide rail and
- a second linear motor string that is arranged in parallel to the second guide rail; whereby the first guide rail and the first linear motor string are arranged along the first diverging side track and the main track, and the second guide rail and the second linear motor string are arranged along the second diverging side track and the main track; and whereby the method comprises the following steps: moving the transport element along the main track to a branching region of the passive track switch through interaction of at least one permanent magnet, which is preferably aligned transversally to the transport track, and/or non-switching electromagnet that is installed on a response element of the transport element, which is engaged within a gap between the first and the second linear motor string, with the first and the second linear motor string; and guiding of the transport element, which is located in the branching region of the passive track switch, in the direction of the first diverging side track by means of the first linear motor string; whereby the first and the second guide rails, in particular in the area of the passive track switch, are fixed.

The same variations and further developments that were described above in connection with the transport system according to the invention can hereby also be applied to the method for switching a passive track switch. In particular, the first and the second linear motor string for moving the transport element along the main track can be operated synchronously as described above.

Furthermore, guiding of the transport element in the branching region of the passive track switch in the direction of the first or the second side track takes place by means of the first and/or second linear motor string, whereby the propulsion of the transport element occurs through magnetic interaction of the respective linear motor string with the at least single permanent magnet and/or non-switchable electromagnet of the response element of the transport element, and whereby the attraction force due to the interaction of the first linear motor string with the magnets of the response element can be reinforced by the attraction force between the magnet of the response element and a ferromagnetic component of the first linear motor string in the branching region of the passive track switch in such a way that the transport element can be guided along the first guide rail while being held in the plane that is formed by the first and the second guide rail. As described above, a disconnection of the contact of one or several bearing elements of the transport element with the second guide rail therefore takes place in the branching region of the track switch in order to enable a guiding process of the transport element in the direction of the first side track. It is clear that the method according to the invention also comprises the equivalent steps for guiding the transport element in the direction of the second diverging side track. The invention further comprises a method for switching a passive track switch for systematic guiding of a transport element from a first or second side track to a main track of the track switch, whereby guiding of the transport element, which is located in the branching region of the track switch, takes place by means of the linear motor string on the side of the respective side track in this case as well.

According to the invention, the first guide rail and the first linear motor string are arranged along the first diverging side track and the main track, and the second guide rail and the second linear motor string are arranged along the second diverging side track and the main track. Hence, the first guide rail and the second guide rail form the external guide rails of the passive track switch with the two diverging side tracks.

According to another further development, a power supply of the second linear motor string in the branching region of the passive track switch can be interrupted by means of a control unit of the transport system when the transport element enters the branching region in order to support guiding of the transport element in the direction of the first diverging side track. Accordingly, the power supply of the first linear motor string can be interrupted in the branching region in order to support guiding of the transport element in the direction of the second side track. The interruption of the power supply of the first or second linear motor string can hereby occur in particular through an electronic switch of the control unit of the transport system, which connects either the first linear motor string or the second linear motor string to the power supply.

In an alternative further development, a magnetic polarity of the second linear motor string in the branching region of the passive track switch can be inverted by means of a control unit of the transport system when the transport element enters the branching region in order to support guiding of the transport element in the direction of the first diverging side track.

The same variations and further developments that were described before in connection with the transport system according to the invention can also be applied to the methods for switching the passive track switch mentioned here. In particular, a high-frequency alternating current can be superimposed on the electric current that flows through the electric windings of the second linear motor string, which causes an additional repellency between the second linear motor string and an electrically conductive element of the response element of the transport element.

According to an alternative or additional further development, a force can be applied through activation of a conveyor drive, which is installed in the branching region of the passive track switch, to a contact area of the transport element, which is arranged in a way that it comes in contact with the conveyor drive in the branching region of the track switch, in the direction of the first diverging side track. The same variations and further developments, which were described above in connection with the passive track switch with a conveyor drive according to the invention, can also be applied here.

In each of the methods described above, the position of a transport element in the intake to the passive track switch can be determined continuously or in regular intervals, particularly by means of sensors arranged along the transport track, in particular along the main track, whereby, when a predefined distance of the transport element from the track switch tip of the track switch is reached, switching of the passive track switch can occur through switching off the power supply and/or reversing the polarity of a linear motor string and/or through activation of one or several conveyor belts of a group of conveyor belts to convey the transport element in the direction of the first or the second side track without mechanical movement of parts of the guide rails. The activation of the conveyor drive can thereby be combined with switching through interruption of the power supply and/or polarity reversal of a linear motor string in order to reduce the error rate of the track switch.

As, according to the abovementioned methods, no parts of the guide rails have to be moved mechanically in the area of the track switch, a short switching time of the passive track switch and hence a high throughput of transport elements can be achieved. In addition, the mechanical wear of the track switch can be reduced through the elimination of mechanical sliding elements. Moreover, no additional electromagnets are required for switching of the passive track switch either. As switching of the track switch can occur by means of the linear motor string that is also responsible for the propulsion, an even propulsion of the transport element while passing the track switch is possible.

Further features and exemplary embodiments as well as benefits of the present invention will be explained in greater detail by means of the drawings in the following. It is clear that the embodiments are non-exhaustive with regard to the field of the present invention. It is further clear that some or all of the features described in the following can also be combined with each other in a different way.

DESCRIPTION OF PREFERRED EMBODIMENTS

Figure 1:
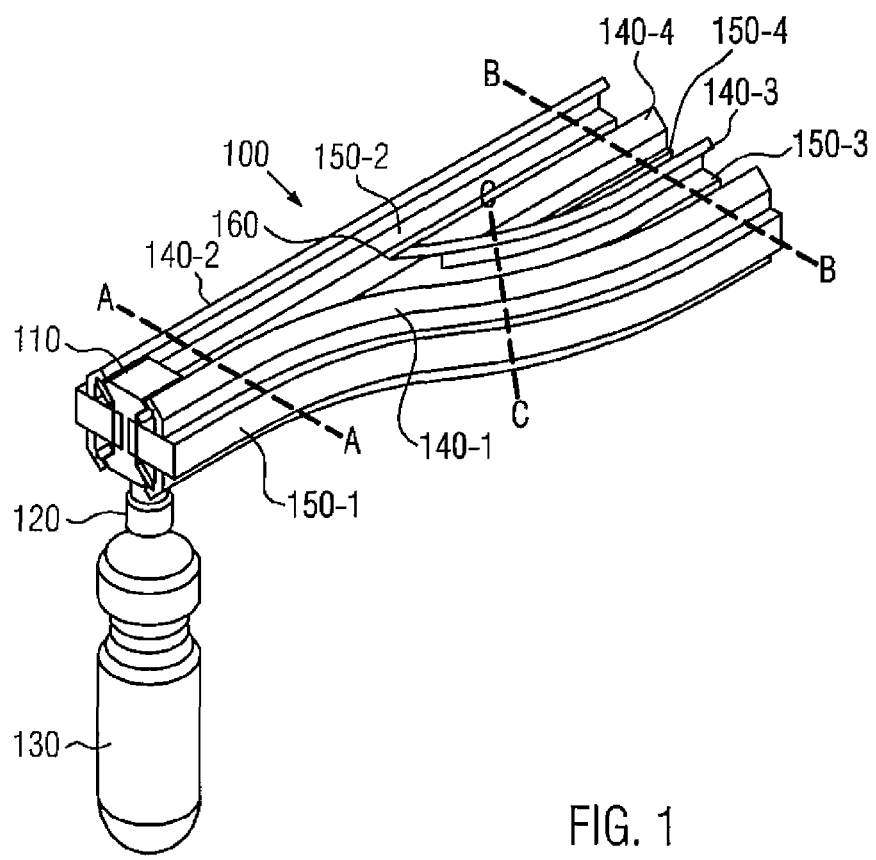
FIG. 1 shows an exemplary embodiment of a passive track switch according to the present invention in a three-dimensional top view.

FIG. 1 shows and exemplary embodiment of a passive track switch according to the present invention in a three-dimensional top view. The displayed passive track switch 100 consists of the main track, which points towards the front in the perspective display, a straight side track, which points to the rear left in the display, as well as a curved side track that points to the rear right in the display. The main track is connected to the side track on the right through a curved first guide rail 140-1 along which a first linear motor string 150-1 is installed. In addition, the main track is connected to the side track on the left through the straight second guide rail 140-2 along which a second linear motor string 150-2 is installed. However, the present invention is not limited to passive track switches in which one of the guide rails is straight, but also comprises track switches in which both side tracks and hence both guide rails are curved.

On the track switch tip 160, complementary guide rails 140-3 and 140-4 of the right and/or left side track as well as the pertaining complementary linear motor strings 150-3 and/or 150-4 begin accordingly. Hence, two linear motor strings guided in parallel, through which the propulsion of the transport element is ensured, are positioned opposite to each other everywhere outside of the branching region of the passive track switch. The linear motor strings thereby comprise a plurality of electric windings, which are not shown here, in form of electromagnets that can be activated individually or as a block and that are controlled by a control and/or regulating unit of the transport system, which is not shown.

The passive track switch extends from the place at which the first and the second guide rail 140-1 and 140-2 start to diverge, indicated by the dotted line A-A, up to a point where the two side tracks have diverged up to a predetermined distance, indicated by the dotted line B-B. Both straight as well as curved continuations of the main track and/or the side tracks in a modular design can be put onto the track switch. The branching region of the track switch can hereby be defined as the area between the beginning divergence of the first and second guide rail, indicated by the dotted line A-A, and the points of the side tracks that are closest to the track switch tip 160 and at which the curvature of the respective guide rail is zero. In the special case displayed here, this point for the side track on the right is indicated by the dotted line C-C. In the straight side track on the left, the end of the branching region of the track switch can be as closest to the track switch tip 160 as desired. For reasons of structural engineering, elements of the passive track switch such as the conveyor drive described further below can be arranged in a way that they extend along the respective side track starting from the track switch tip over a distance that is equal for both side tracks. A plurality of variations is possible in this respect. The delimitation lines for the passive track switch and the branching region of the track switch shown here shall therefore be understood as exemplary embodiments that do not restrict the object of the present invention. In particular, the branching region of the track switch can also be extended up to the dotted line B-B.

Also a transport element 110 in the area of the main track outside of the branching region is shown in an exemplary way in FIG. 1. By means of a gripping element 120, the shown transport element 110 transports a container 130 that is exemplarily shown as a plastic bottle here. In the shown special embodiment, the plastic bottle is arranged in a suspended position below the transport element 110. However, it is clear that the transported container can also be transported in a standing position on the transport element 110, if necessary by means of a respective holding device. Depending on the position on the transported container, the conveyor drive shown in FIG. 4 can therefore be installed above or below the passive track switch.

Figure 2:
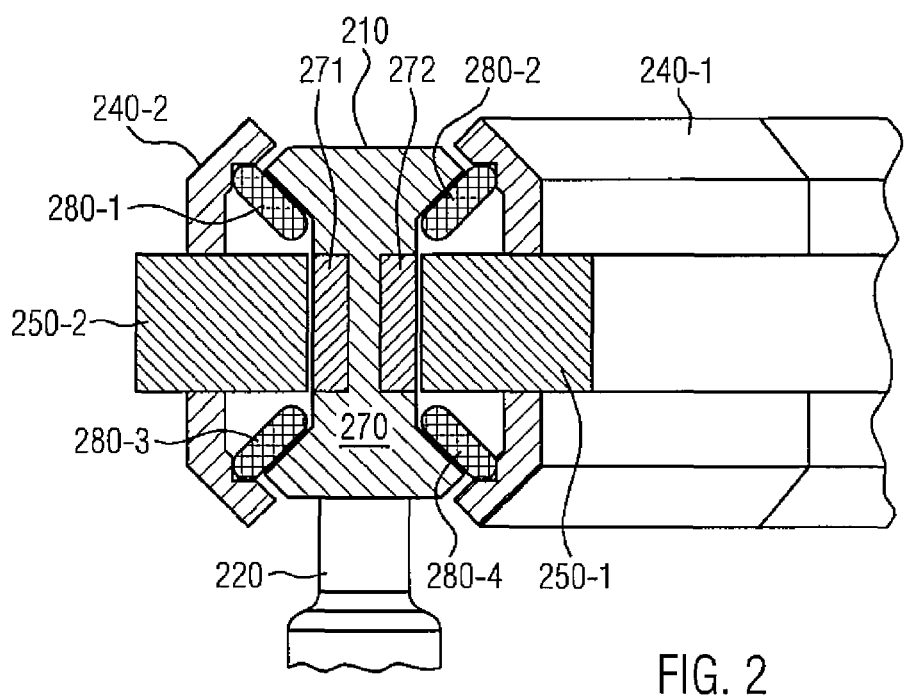
FIG. 2 shows a cross-section of an exemplary embodiment of a transport element according to the present invention in the area of the main track of the passive track switch shown in FIG. 1.

FIG. 2 shows a cross-section through an exemplarily displayed transport element outside of the branching region of the passive track switch. Outside of the branching region, the first guide rail 240-1 and the second guide rail 240-2 with their respective linear motor strings 250-1 and/or 250-2 are arranged in parallel to each other. The transport element 210 that is shown here in an exemplary way is guided between the two guide rails, whereby guide rollers 280-1 to 280-4 as bearing elements of the transport element are in contact with guide troughs that are to be provided specifically for this purpose on the guide rails 240'1 and 240'2 in the special embodiment shown here. With a beginning divergence of the two guide rails in the branching region of the track switch, the contact of the guide rails is disconnected, depending on the activated side track, one-sidedly on the side of one of the two guide rails. In contrast to the guide troughs of the guide rails shown here, the guiding elements have to be interrupted on both sides in the branching region of the passive track switch to disconnect the contact in case of specific alternative embodiments of the guiding elements, e.g. as guide channels or wheel flanges.

Besides the gripping element 220 for the container to be transported, the transport element 210 displayed here has a response element 270 that is used for the propulsion of the transport element along the transport track through interaction with the linear motor strings 250-1 and 250-2. For this purpose, the response element has one or several permanent magnet(s) and/or non-switchable electromagnets of which only two magnetic poles 271 and 272 are displayed here in an exemplary way. In the displayed exemplary embodiment, the response element comprises permanent magnets, which are installed separately from each other on both sides and which are arranged in the plane whose normal connects the two guide rails perpendicularly to each other (check against FIG. 3). Between the permanent magnets arranged on both sides and/or the non-switching electromagnets, the transport element can, as shown, have an electrically conductive and/or ferromagnetic component, e.g. in form of a carrier plate. As described above and in case of use of a high-frequency alternating field in one of the two linear motor strings, an electrically conductive component is hereby magnetically repelled from one respective linear motor string due to induced currents. Also a ferromagnetic component can be repelled in this way if appropriate high frequencies are chosen, whereby an attraction force between the linear motor string on the side of the target side track and the ferromagnetic component supports holding of the transport element on the guide rail on the side of the target side track.

According to the present invention, the transport element does not comprise any separate (switching) electromagnets in order to guide the transport element in the branching region of the track switch in the direction of one or the other side track. Instead, switching of the passive track switch according to the present invention occurs only through interaction of one or both linear motor strings in the branching region of the track switch with the permanent magnet(s) and or non-switching electromagnet(s) of the response element 270. For example and as described before, a segment of the linear motor string 250-2 in the branching region of the passive track switch can be separated from the current or reversed in terms of its magnetic polarity for guiding the transport element in the direction of the side track on the right shown in FIG. 1, so that the attraction force between the linear motor string 250-2 and the magnet of the response element 270, which holds the transport element 210 on the second guide rail 240-2 outside of the branching region of the track switch, does not apply and/or is transformed into a repelling force. To prevent the transport element in the branching region of the track switch from slipping completely out of the guide rail, the permanent magnet(s) and or non-switching electromagnet(s) of the response element 270 are dimensioned in a way that the magnetic attraction between them and a ferromagnetic component of the respective linear motor string, which is not shown here, is strong enough to hold the transport element on the respective guide rails even during transport of a payload 130.

Figure 3:
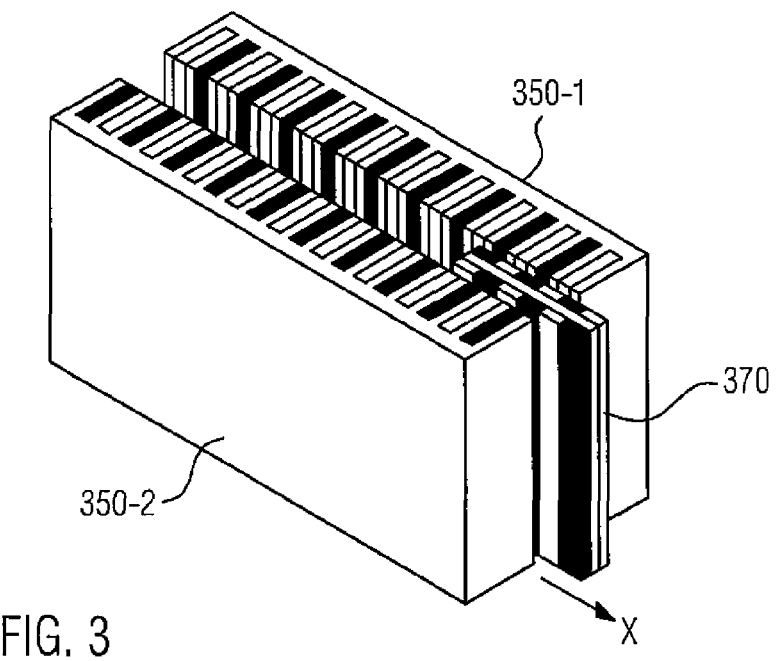
FIG. 3 displays an exemplary embodiment of the response element of the transport element between the external linear motor strings according to the present invention.

A detailed display of the response element 370 of the transport element as well as of the two linear motor strings 350-1 and 350-2 is shown in an exemplary way in FIG. 3. The exemplarily shown response element 370 is equipped on each side with 3 permanent magnets and/or non-switching electromagnets that are aligned along the transport track, i.e. in an x-direction, and that are illustrated by alternating black and white magnetic poles. Accordingly, the sketched linear motor strings 350-1 and 350-2 have electromagnets on the inside with an alternating magnetic polarity along the transport track, which interact with the response element 370 that is located in the gap between the linear motor strings. The displayed magnetic polarity of the linear motor strings is thereby equivalent to a temporal snapshot and operated in the style of a synchronous or asynchronous linear engine for the propulsion of the transport element by means of a control and/or regulating unit of the transport system. Between the permanent magnets and/or non-switching electromagnets that are installed on both sides of the response element 370, a, possibly electrically conductive, carrier element is further shown, which can interact in a magnetically repelling way with a high-frequency alternating field of one of the two linear motor strings. The arrangement of the magnetic poles shown here, both of the response element as well as of the linear motor strings, is shown as a non-restrictive example. A plurality of alternative arrangements, e.g. as a Halbach array, is possible in the context of the present invention.

Figure 4:
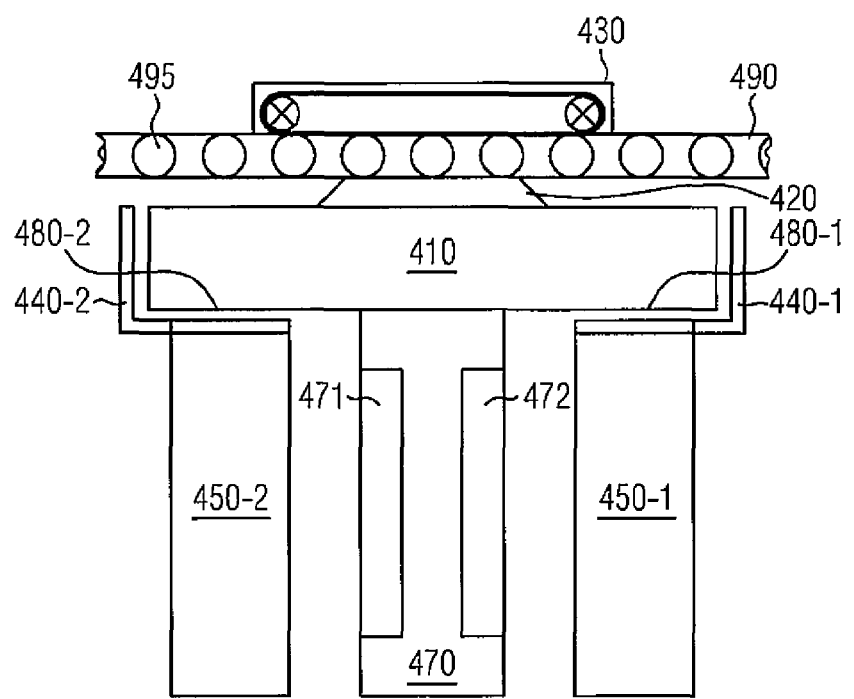
FIG. 4 displays an exemplary embodiment of a conveyor drive with a ball mat in the branching region of the passive track switch according to the present invention.

FIG. 4 shows a sketch of the conveyor drive of a passive track switch in the area of beginning ramification of the guide rails. In contrast to FIGS. 1 and 2, the transport element 410 is positioned on the guide rails 440-1 and 440-2 by means of a slide bearing 480-1 and 480-2. To reduce friction, the contact areas of the slide bearings as well as of the guide rails can be coated for example with Teflon or another material with a low friction coefficient. Also here, the response element 470 of the transport element is engaged within the gap between the linear motor strings 450-1 and 450-2 and has magnets 471 and 472 that are arranged separately on both sides. In addition, the displayed transport element has an elevation 420 in the upper area, which has a contact area that comes in contact with a conveyor drive 430 of the passive track switch in the branching region of the passive track switch via a ball mat 490 with ball elements 495 that is schematically displayed here. Outside of the branching region of the track switch, the elevation 420 moves without any contact to elements of the transport track in order to avoid increased friction. Depending on the direction in which the conveyor drive 430 is operated, a counteracting force, by means of which the transport element can be driven in the direction of the first or the second side track, is applied to the contact area of the transport element 410 by means of the ball elements 495.

Figure 5:
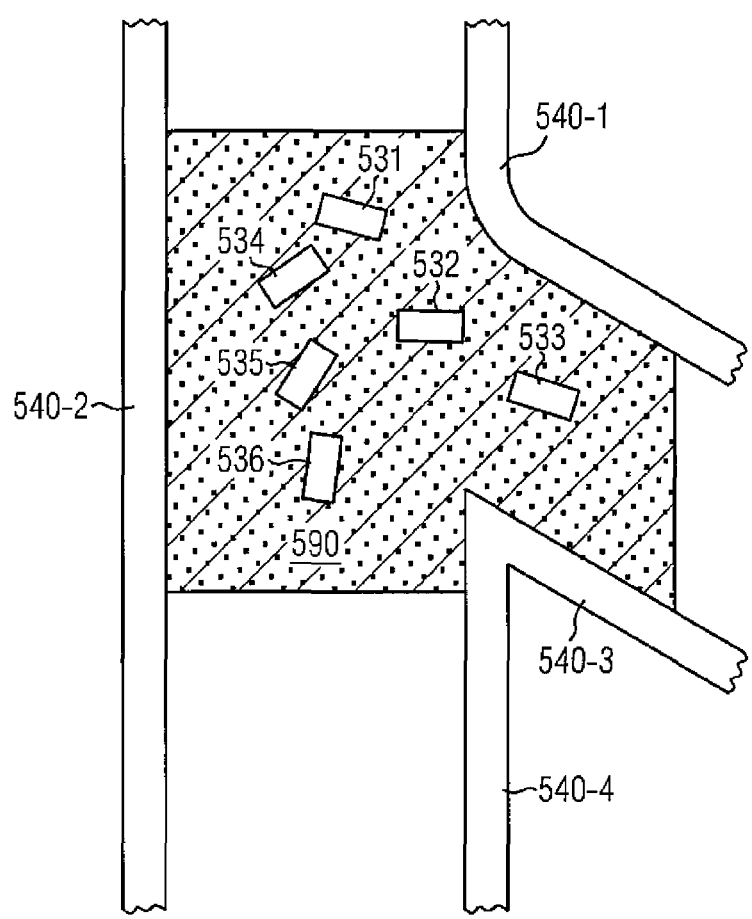
FIG. 5 shows a sketch of an exemplary arrangement of the groups of conveyor belts of the conveyor drive according to the present invention for a passive track switch with a straight and a forking side track.

The conveyor drive can thereby comprise two groups of short conveyor belts that are arranged along the direction of the respective side track. FIG. 5 shows an example of a case in which two groups with respectively three conveyor belts are arranged above the ball mat 590 in the branching region of the passive track switch. Of the passive track switch, only the first and the second guide rail 540-1 and 540-2 as well as the two complementary guide rails 540-3 and 540-4 of the two side tracks are shown here for reasons of simplicity.

Each of the two groups of conveyor belts comprises in the special, non-limiting embodiment, which is shown here, three individual conveyor belts 531 to 533 and/or 534 to 536 that are arranged essentially along the center line between the guide rails in the direction of the respective side track. Hence, the conveyor belts in the displayed case are arranged obliquely to the movement direction of the transport element in such a way that, through rotation of the conveyor belts, both a deflecting force is applied perpendicularly to the guide rail of the target side track and a propulsion of the transport element in the direction of the target side track is triggered. In particular, the displayed conveyor belts are arranged on the guide rail 540-1 and/or 540-2 that corresponds to the target side rail in a tilted way in relation to the normal, whereby the tilt angle increases in the direction of the target side rail in a way that the first conveyor belt 531 and/or 534 of the respective group essentially applies a deflecting force in the direction of the respective guide rail 540-1 and/or 540-2 onto the contact area of the transport element and the last conveyor belt 533 and/or 536 of the respective group essentially applies a force that supports the propulsion of the transport element in the direction of the target side track onto the contact area of the transport element. Also in this context, a plurality of alternative arrangements and alternative numbers of conveyor belts of the conveyor drive are possible.

Holding and guiding the transport element safely on the guide rail 540-1 and/or 540-2 that corresponds to the side track can be achieved through the oblique position of the individual conveyor belts of the conveyor drive, whereby the force that is applied perpendicularly to the guide rail supports a magnetic attraction between the magnet(s) of the response element of the transport element and a ferromagnetic component of the respective linear motor string. In particular, the conveyor drive illustrated in FIGS. 4 and 5 for switching a passive track switch can be combined in an advantageous way with the switching method described above through disconnection of the power supply and/or reversal of the polarity of a segment of a linear motor string in the branching region of the track switch in order to reduce the error rate of the track switch. In all embodiments shown here, the passive track switch does not have any mechanically moved parts so that the switching time of the track switch can be reduced significantly in relation to the track switches known in the state of the art. In addition, no additional electromagnets of the transport element are required to control the transport element, whereby the control and/or regulating unit of the transport system can be simplified. Due to the elimination of mechanically moved parts of the guide rails, mechanical wear of the track switch is reduced in addition.

What is claimed is:

1. A transport system, comprising:
    a transport track with at least one passive track switch, the transport track including (i) a first guide rail, (ii) a second guide rail that is located opposite to the first guide rail in the region of a main track, (iii) a first linear motor string that is arranged parallel to the first guide rail, and (iv) a second linear motor string that is arranged parallel to the second guide rail; and
    at least one transport element arranged movably on the transport track,
    wherein:
        the at least one passive track switch comprises the main track and first and second diverging side tracks of the transport track,
        the transport element has a response element with at least one permanent magnet or non-switching electromagnet, the response element being engaged within a gap between the first and the second linear motor string,
        the transport element is movable along the transport track by means of interaction of the at least one permanent magnet or non-switching electromagnet with the first or second linear motor string,
        the first and the second guide rail are fixed, and
            the passive track switch comprises a switch through which a magnetic polarity of at least one of the first linear motor string or the second linear motor string in the branching region of the track switch is selectively inverted for switching of the passive track switch.

2. The transport system according to claim 1, wherein the first and the second linear motor string have a ferromagnetic component in a branching region of the passive track switch.

3. The transport system according to claim 2, wherein the at least one permanent magnet or the non-switching electromagnet is configured such that a magnetic attraction force between (i) the at least one permanent magnet and the first linear motor string or (ii) the non-switching electromagnet and the second linear motor string, is suitable to hold the transport element, the transport element being loaded with a predetermined payload in the branching region of the passive track switch in a plane that is formed by the first and the second guide rail.

4. The transport system according to claim 1, wherein the switch is integrated in a control unit of the transport system.

5. The transport system according to one of claim 1, wherein the first and the second linear motor string in the branching region of the passive track switch are formed in a way such that magnetic poles associated with the first and the second linear motor string, respectively, located opposite to each other are polarized in one of (i) a cophasal manner, or (ii) an antiphase manner, as a function of at least one of an orientation of the at least one permanent magnet or a polarity of the non-switching electromagnet of the transport element.

6. The transport system according to one of claim 1, wherein the passive track switch has a conveyor drive in the branching region of the passive track switch,
    wherein the transport element has a contact area that is arranged such that the contact area comes in contact with the conveyor drive in the branching region of the passive track switch, and
    wherein the conveyor drive comprises at least a first conveyor belt configured to be activated by means of a control unit of the track switch.

7. The transport system according to claim 6, wherein the first conveyor belt is arranged to apply a force, in an activated state, onto the contact area of the transport element in the direction of the first diverging side track, the transport element being located in the branching region of the passive track switch.

8. The transport system according to claim 7, wherein the applied force supports a propulsion of the transport element in the direction of the first diverging side track.

9. The transport system according to one of claim 6, wherein the contact area of the transport element comes in contact with the conveyor drive via a ball mat in the branching region of the passive track switch.

10. A method for switching a passive track switch of a transport system with a transport track and at least one transport element, the at least one transport element being arranged movably on the transport track, the passive track switch including a main track and first and second diverging side tracks of the transport track, the transport track including (i) a first guide rail; (ii) a second guide rail that is located opposite to the first guide rail in the region of the main track; (iii) a first linear motor string that is arranged in parallel to the first guide rail; and (iv) a second linear motor string that is arranged in parallel to the second guide rail, the first guide rail and the first linear motor string being arranged along the first diverging side track and the main track, and the second guide rail and the second linear motor string being arranged along the second diverging side track and the main track, the method comprising:
    moving the transport element along the main track to a branching region of the passive track switch through interaction of the at least one permanent magnet or non-switching electromagnet, the at least one permanent magnet or non-switching electromagnet being arranged in a transversal position to the transport track, the at least one permanent magnet or non-switching electromagnet being disposed on a response element of the transport element, and the response element being engaged within a gap between the first and the second linear motor string; and
    guiding the transport element located in the branching region of the passive track switch in a direction of the first diverging side track by means of the first linear motor string,
    wherein the first and the second guide rail are fixed, and
    wherein a magnetic polarity of at least one of the first linear motor string or the second linear motor string in the branching region of the passive track switch is inverted by means of a control unit of the transport system when the transport element enters the branching region to support guiding of the transport element in the direction of the first diverging side track.

11. The method according to claim 10, further comprising:
    activating a conveyor drive that is located in the branching region of the passive track switch to apply a force to a contact area of the transport element, the contact area being disposed in a way that the contact area comes in contact with the conveyor drive in the branching region of the track switch in the direction of the first diverging side track to guide the transport element in the direction of the first diverging side track.

12. The transport system according to claim 1, wherein the first and second guide rail are fixed in the region of the passive track switch.

13. The transport system according to claim 2, the ferromagnetic component comprising an iron core.

14. The method according to claim 10, further comprising:
fixing the first and second guide rail at least in the region of the passive track switch.

15. A transport system, comprising:
a transport track with at least one passive track switch, the transport track including (i) a first guide rail, (ii) a second guide rail that is located opposite to the first guide rail in the region of a main track, (iii) a first linear motor string that is arranged parallel to the first guide rail, and (iv) a second linear motor string that is arranged parallel to the second guide rail; and
at least one transport element arranged movably on the transport track,
wherein:
the at least one passive track switch comprises the main track and first and second diverging side tracks of the transport track,
the transport element has a response element with at least one permanent magnet or non-switching electromagnet, the response element being engaged within a gap between the first and the second linear motor string,
the transport element is movable along the transport track by means of interaction of the at least one permanent magnet or non-switching electromagnet with the first or second linear motor string,
the first and the second guide rail are fixed, and
the first and the second linear motor string in the branching region of the passive track switch are formed in a way such that magnetic poles associated with the first and the second linear motor string, respectively, located opposite to each other are polarized in one of (i) a cophasal manner, or (ii) an antiphase manner, as a function of at least one of an orientation of the at least one permanent magnet or a polarity of the non-switching electromagnet of the transport element.

* * * * *